United States Patent
Frisch et al.

(10) Patent No.: US 6,731,879 B1
(45) Date of Patent: May 4, 2004

(54) SUBMARINE COMMUNICATIONS SYSTEM AND LANDING-STAGE THEREFOR

(75) Inventors: David Antony Frisch, London (GB); Nigel Richard Parsons, Kent (GB)

(73) Assignee: Alcatel, Paris (FR)

( * ) Notice: Subject to any disclaimer, the term of this patent is extended or adjusted under 35 U.S.C. 154(b) by 524 days.

(21) Appl. No.: 09/638,905

(22) Filed: Aug. 15, 2000

(30) Foreign Application Priority Data

Aug. 18, 1999 (GB) .............................. 9919580

(51) Int. Cl.$^7$ ................................ H04B 10/00
(52) U.S. Cl. ................... 398/104; 398/105; 398/178; 340/850
(58) Field of Search ................. 359/141, 127, 359/173, 179; 398/104–105, 82, 45, 141, 178; 340/850

(56) References Cited

U.S. PATENT DOCUMENTS

| | | | | |
|---|---|---|---|---|
| 3,644,787 A | * | 2/1972 | Hamilton ..................... | 361/56 |
| 5,214,312 A | * | 5/1993 | Inoue ......................... | 307/43 |
| 5,446,392 A | * | 8/1995 | Inoue et al. ................. | 324/678 |
| 5,526,157 A | * | 6/1996 | Kawano ...................... | 359/141 |
| 5,532,478 A | * | 7/1996 | Kogure ....................... | 250/227.24 |
| 5,559,622 A | | 9/1996 | Huber et al. ................. | 359/110 |
| 5,594,581 A | | 1/1997 | Alphonsus .................... | 398/6 |
| 5,838,477 A | * | 11/1998 | Yamamoto et al. .......... | 359/179 |
| 6,166,836 A | * | 12/2000 | Crameri et al. .............. | 359/110 |
| 2002/0057477 A1 | * | 5/2002 | Rocca et al. ................. | 359/141 |
| 2003/0151521 A1 | * | 8/2003 | Horinouchi et al. ......... | 340/850 |

FOREIGN PATENT DOCUMENTS

| | | |
|---|---|---|
| EP | 0 372 711 A2 | 6/1990 |
| FR | 2 749 725 A1 | 12/1997 |

* cited by examiner

Primary Examiner—Kinfe-Michael Negash
(74) Attorney, Agent, or Firm—Sughrue Mion, PLLC

(57) ABSTRACT

To diminish the risk of interruption of traffic in a submarine optical cable system in the region of the shore where damage is most likely to occur, the landing-stage of the system has duplicated spaced-apart cables between a submerged branching unit and an onshore submarine line terminal endstation. Various changeover modes are disclosed, including those where both cables are coupled to signals at all times and changeover is accomplished by blocking amplifiers.

20 Claims, 3 Drawing Sheets

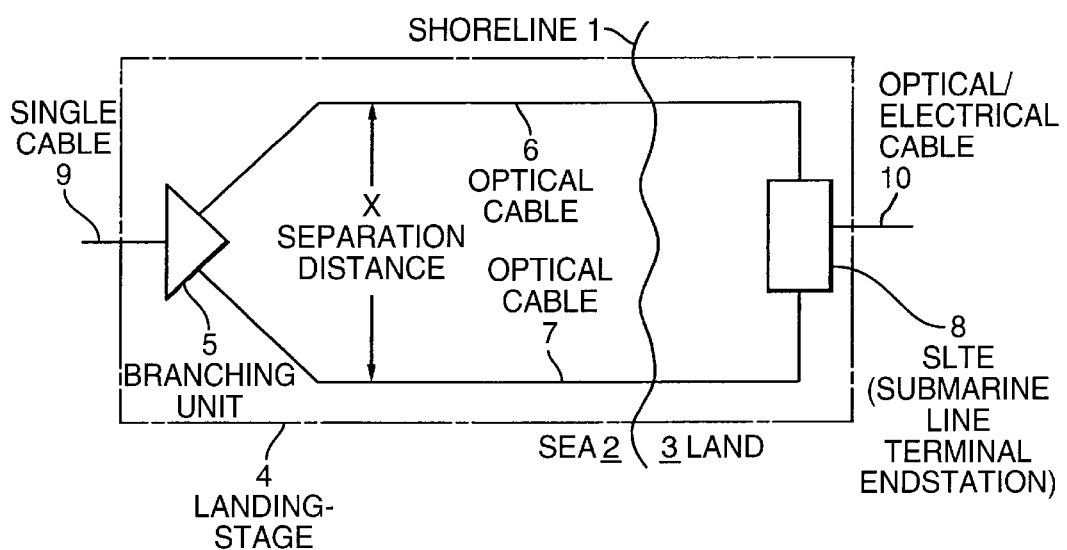
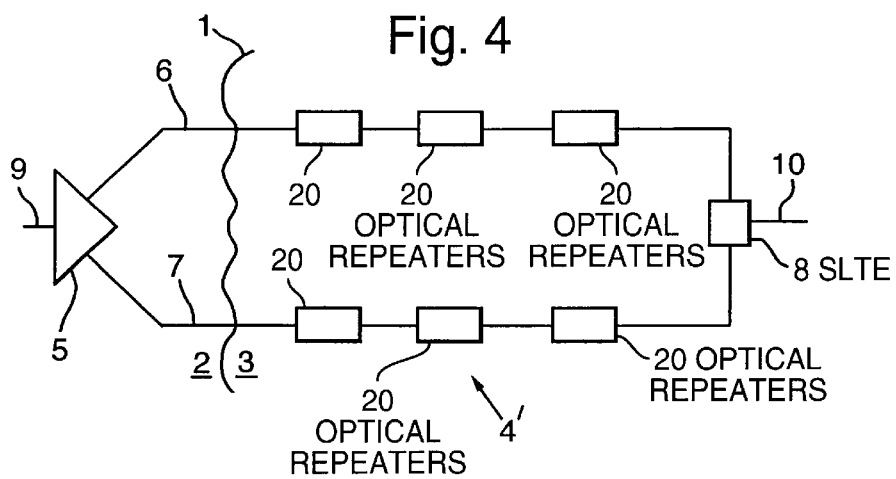
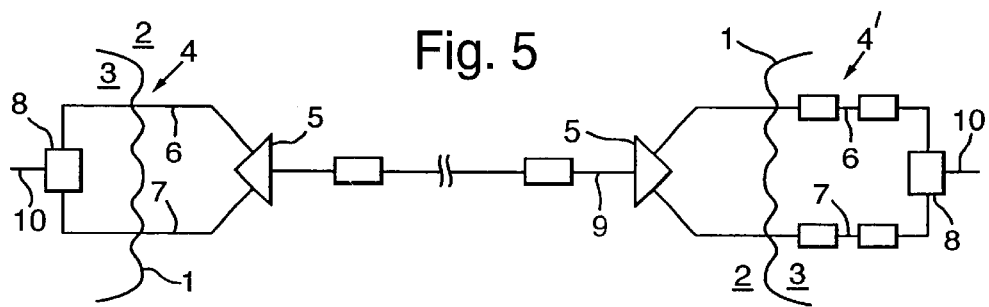

SUBMARINE COMMUNICATIONS SYSTEM AND LANDING-STAGE THEREFOR

FIELD OF THE INVENTION

The present invention relates to a landing-stage for a submarine communications system. The term "landing-stage" refers to the region of such a system where it approaches and reaches a shoreline.

BACKGROUND TO THE INVENTION

Submarine cables of a submarine communications system are frequently damaged by external influences such as ships' anchors trailing on the sea-bed. When a cable is damaged, it must be de-powered to enable repairs to be carried out and in a de-powered state, the cable cannot carry traffic. This loss of capacity is expensive for cable operators since it may be several days before a repair ship arrives to assess the damage to the cable and repair the fault.

Damage to the submarine cables usually occurs at the landing-stage of the communications system where the shallowness of the water along the shoreline increases the chance of interference and damage by e.g. nets or anchors. The cables are either provided with a heavily armoured coating and left to lie on the sea-bed or they are provided with a lightly armoured coating and are buried beneath the sea-bed to protect them. However, despite these provisions the cables are still occasionally damaged.

To address the problem and ensure that bit rate capacity is maintained on the network in the event of a fault on the submarine cable, EP-A-0372711 proposes to provide two parallel submarine cables spanning the entire length of the link with a protection switching system between them to switch traffic flow to an undamaged cable in the event of damage to one of the cables. However, this is clearly an expensive solution.

In US-A-5559622 switching between alternative fibres of a double light waveguide connection is automatically achieved in the event of damage to or failure of one of the fibres.

SUMMARY OF THE INVENTION

According to the present invention, a landing-stage for a submarine optical communications system comprises a submerged branching unit having a number of ports and an onshore submarine line terminal endstation ("SLTE"), wherein the branching unit is adapted to be capable of coupling traffic carried by a submarine optical cable connected to one port of the branching unit to or from the SLTE via at least two at least partially submerged optical cables connected to respective other ports of the branching unit, said at least two cables being spaced apart from each other.

The present invention provides a space-diversity protection system whereby in the event of a fault occurring on an optical cable in a shallow water region of a submarine communications system, due for example to a trailing ships' anchor, traffic can be re-routed onto an undamaged cable in the system thereby maintaining system capacity. Furthermore, the advantages are achieved without requiring parallel cabling over the entire length of the link. As such, the present invention provides substantial advantages over conventional systems.

Preferably, the branching unit comprises an optical switch arranged to couple the traffic to a selected one of said at least two submarine cables.

Alternatively, the branching unit may comprise an optical splitter arranged to couple the traffic onto or receive traffic from each of said at least two submarine cables.

Preferably, at least one of said at least two submarine cables has at least one submarine optical repeater connected to it, located in-shore.

More preferably, the submarine line terminal endstation is located at a customers' point of presence.

According to a second aspect of the present invention, a submarine communications system comprises a single offshore submarine cable coupled to a landing-stage according to the first aspect of the present invention.

BRIEF DESCRIPTION OF THE DRAWINGS

Examples of the present invention will now be described in detail with reference to the accompanying drawings, in which:

FIG. 1 shows a first example of a landing-stage according to the present invention;

FIG. 4 shows a second example of a langing-stage according to the present invention; and FIG. 5 shows a submarine communication system embodying the present invention.

DETAILED DESCRIPTION

Figure 2A:
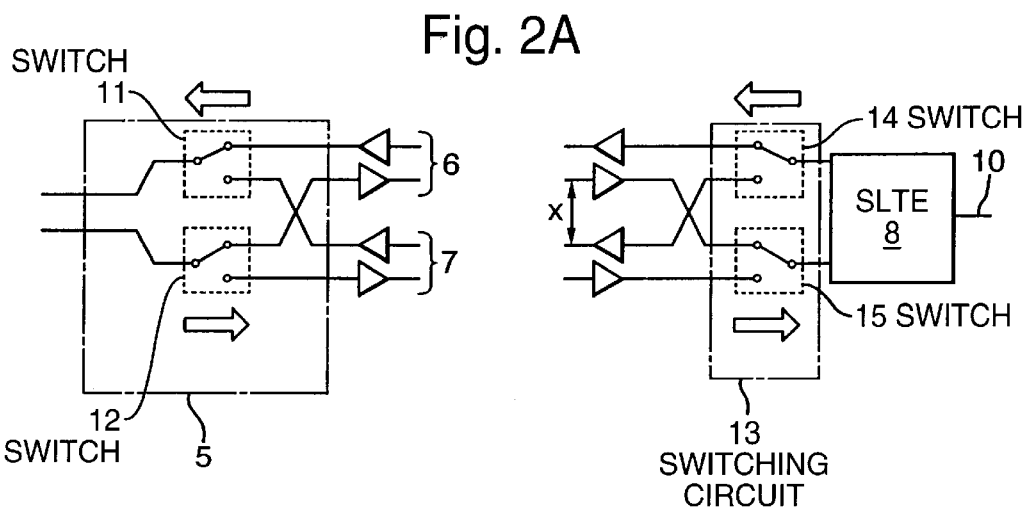
FIGS. 2A and 2B, 3A and 3B show respective examples of changeover circuits suitable for use in the landing-stage of the present invention.

FIG. 1 shows an example of a landing-stage for a submarine communications system in the region of the shoreline 1 which is the transition between sea 2 and land 3. The landing-stage 4 includes a submerged branching unit 5 and a pair partially submerged of submarine optical cables 6 and 7 coupling respective ports of the branching unit 5 to a single onshore submarine line terminal endstation (SLTE) 8. The cables 6 and 7 are partially submerged in the sense that part of their length is on land, part is submerged. A single cable 9 runs from one port of the branching unit 5 to a remote endstation (possibly via a similar landing-stage), and one or more optical or electrical cables 10 run on land from the SLTE 8 to eventual end-users. As will be explained below, data can be selectively routed along submarine cables 6 and 7 such that in the event of a fault occurring on one of the cables data can be re-routed solely along the undamaged cable. Since only a single SLTE is required, the costs of implementing such a system are low compared to the costs associated with submarine communications systems having two parallel cables/systems and a protection switching system to switch between the two as and when necessary.

The separation x of cables 6 and 7 is sufficiently large so that the chance of both cables being damaged by the same anchor is minimal. A separation of 50 km may be used although this may depend on the level of fishing activity in the area. For example, in heavily fished waters a large separation would be used, whereas in lightly fished waters a separation of only 10 km may be used. The branching unit 5 is preferably positioned on the deep water side of the boundary between deep water and shallow coastal waters, usually at a depth greater than 1000 m.

To control the routing of data, the branching unit 5 and SLTE 8 include circuits arranged to reroute the signals as required in the event of a fault on one of the cables 6 and 7. The powering of the landing-stage is achieved by conventional feeding via one of the submarine cables 6 to a sea earth and feeding via the other cable 7 to a remote point on the system. The SLTE 8 includes power feeding circuitry (not shown) to perform this operation.

FIGS. 2A to 3B show examples of changeover circuits for use in the landing-stage of FIG. 1. In each of the examples, a single fibre pair is shown in each cable 6,7 although in practice the circuits could be modified to incorporate two or more fibre pairs. Furthermore, the cables 6 and 7 are bidirectional, since each has a fibre pair in which one fibre of the pair is configured to allow signal propagation in one direction and the other of that pair is arranged to allow signal propagation in the opposition direction.

Referring to FIG. 2A, the branching unit 5 includes a pair of two-way optical switches 11 and 12 used to select received signals and transmit outgoing signals in one routing only, for each pair of fibres. The branching unit 5 and the SLTE 8 are coupled together by submarine cables 6 and 7 connected in parallel. The SLTE 8 includes a switching circuit 13 having a second pair of switches 14 and 15. In the configuration shown, the switches are arranged to route signals along cable 6. If switches 11–15 are all switched to their alternative configurations, signals will be routed along cable 7 instead. Thus, if a fault is detected in one of the cables 6 or 7, the switches can be reconfigured to reroute signals to avoid the damaged cable. As shown, despite the use of two cables in the landing-stage, only a single SLTE 8 is required to receive the signals.

In use, in the event of a detected fault in one of cables 6 and 7, a user at the SLTE 8 provides a control signal to the branching unit 5 and the SLTE 8. The configuration of the switches is changed and the landing-stage is now configured to route signals along cable 7 instead of cable 6.

Figure 2B:
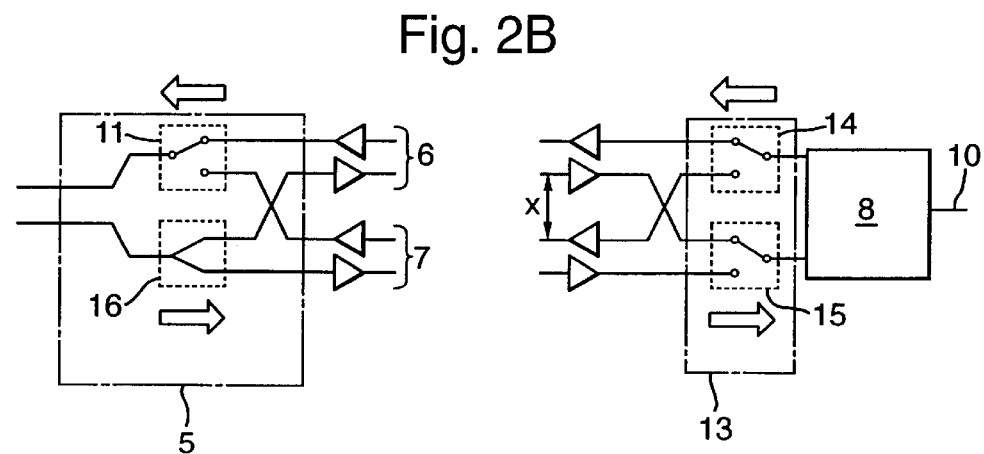

FIG. 2B shows an alternative changeover arrangement. In this case, optical switch 12 of FIG. 2A has been replaced by a 50:50 coupler/splitter 16. As such, a received input signal is always coupled to both of cables 6 and 7. Again, at the SLTE end of the landing-stage, the pair of switches 14 and 15 act to configure a path between the branching unit 5 and the SLTE 8.

The use of 50:50 coupler/splitters in place of optical switch 16 in the branching unit 5 improves the reliability of the landing-stage. Furthermore, the presence of data signals in both of cables 6 and 7 can be used for in-service testing of the landing-stage.

Figure 3A:
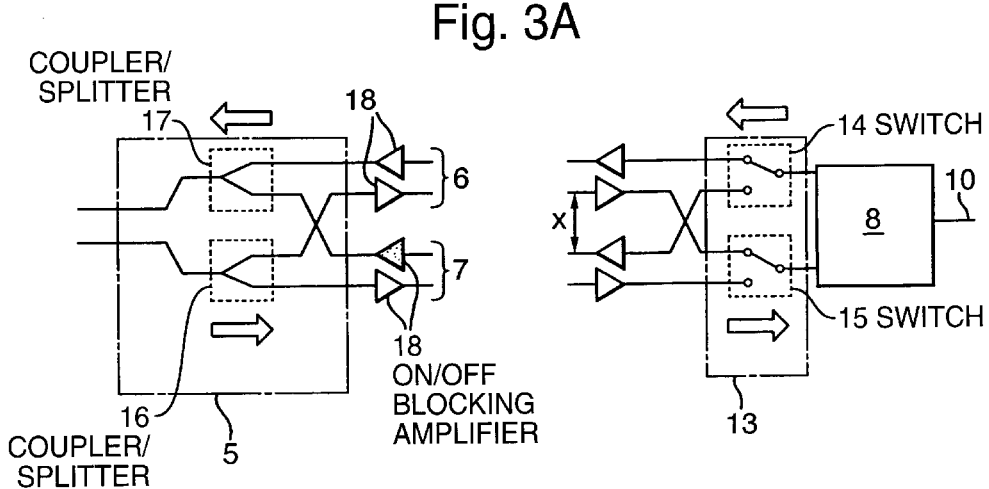

FIG. 3A shows a further example of a changeover arrangement. In this case, switches 11 and 12 of FIG. 2A have been replaced by 50:50 coupler/splitters 17 and 16. To that extent, the branching unit 5 comprises purely passive components and so is not subject to switching failure. In this case, since there are no switches to control the transmission paths, on/off-blocking amplifiers 18 are provided to support the transmission paths. The amplifiers 18 are controlled for example by a control signal provided by an operator at the SLTE 8, used to switch the respective pump sources for the optical amplifiers on or off. When the amplifiers are switched off, they function as high attenuation paths or effective blockers. The amplifiers 18 may be provided in the branching unit 5 or may be connected to the respective cable 6,7 at a remote location relative to the branching unit.

Figure 3B:
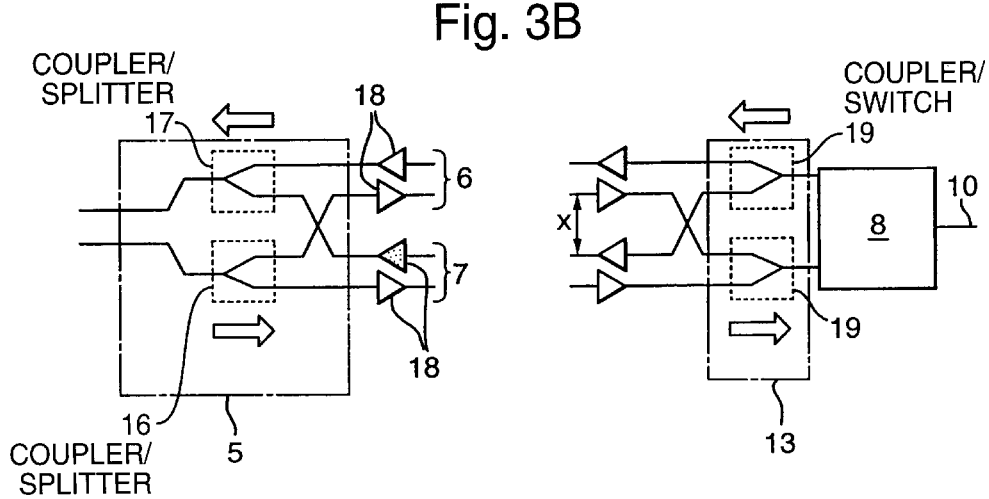

FIG. 3B shows yet another example of a changeover arrangement. In this case, switches 11, 12, 14 and 15 of FIG. 2A have been replaced by 50:50 coupler/splitters 16, 17 and 19. On/off-blocking amplifiers 18 are again used to reconfigure the transmission paths as and when required. As in the examples shown in FIGS. 2B and 3A, the presence of data signals in both of cables 6 and 7 can be used to assist in-service testing of the communications network. It would also be possible to have one switch and one splitter at the SLTE.

FIG. 4 shows another example of a landing-stage 4' for a submarine communications network. The landing-stage has a branching unit 5 and an SLTE 8 having one of the changeover circuits described above with reference to any of FIGS. 2A to 3B. The landing-stage 4' also includes a number of submarine optical repeaters 20 arranged at intervals along the parallel submarine cables 6,7 connecting the branching unit 5 and the SLTE 8. In this example, all of the optical repeaters 20 are positioned on land although they or some of them could be positioned on the sea bed as in a repeatered link of a conventional submarine communications network—in this respect see FIG. 5.

By providing submarine optical repeaters on the land based submarine cables of the landing-stage, it is possible to have the SLTE 8 located at a customer's point of presence which may be a substantial distance inland. Therefore, whereas in conventional systems the link to a customer's point of presence includes a submarine line terminal to receive the signals from the submarine cable, a first land station to receive the processed signals from the submarine line terminal and a second land station at the customer's point of presence to receive the signals from the first land station, in the present invention a single SLTE 8 may be provided at the customers' point of presence. Thus, the amount of complex hardware required to receive and process optical signals from the communication system is greatly reduced.

FIG. 5 shows an example of a complete submarine communications system embodying the present invention. The system includes first and second landing-stages selected from the examples shown in FIGS. 1 to 4, at respective ends of a conventional repeatered single submarine cable 9. In this example, even if one cable 6 or 7 at each end of the system was damaged, the system could continue to operate at full capacity.

What is claimed is:

1. A landing-stage for a submarine optical communications system, comprising:
   a submerged branching unit;
   an onshore submarine line terminal endstation ("SLTE");
   at least two at least partially submerged optical cables between said branching unit and said SLTE;
   a submarine optical cable connected to the branching unit, the branching unit operative to couple the at least two at least partially submerged optical cables to said submarine optical cables, said at least two at least partially submerged optical cables being spaced apart from each other.

2. The landing-stage according to claim 1, in which the branching unit comprises an optical switch arranged to couple the optical cable to a selected one of said at least two at least partially submerged optical cables.

3. The landing-stage according to claim 1, in which the branching unit comprises an optical splitter arranged to couple the optical cable to each of said at least two at least partially submerged optical cables.

4. The landing-stage according to claim 3, in which the branching unit comprises two optical splitters arranged respectively to couple the optical cable to each of said at least two at least partially submerged optical cables.

5. The landing-stage according to claim 4, further comprising a respective on/off blocking amplifier connected to each of said at least two at least partially submerged optical cables for selectively switching on or off the traffic-carrying capacity of the respective cable.

6. The landing-stage according to claim 5, wherein each optical cable includes at least one pair of optical fibres for respectively conveying traffic in opposite directions.

7. The landing-stage according to claim 1, in which the SLTE comprises coupling means arranged to couple traffic to or receive traffic from said at least two at least partially submerged optical cables.

8. The landing-stage according to claim 6, in which the coupling means comprises an optical switch arranged to couple traffic onto or receive traffic from one or other of said at least two at least partially submerged optical cables.

9. The landing-stage according to claim 6, in which the coupling means comprises an optical splitter arranged to couple the traffic to or receive traffic from each of said at least two at least partially submerged optical cables.

10. The landing-stage according to claim 1, in which at least one of said at least two at least partially submerged optical cables has at least one submarine optical repeater connected in it.

11. A landing-stage for a submarine optical communications system comprising:
   a submerged branching unit operatively coupling a submarine optical cable to at least two at least partially submerged optical cables via respective changeover means which are optical splitter means, said at least two at least partially submerged optical cables operatively coupled to an on-shore SLTE via respective changeover means; and
   control means for determining which of the at least two at least partially submerged optical cables conducts traffic to or from said submarine optical cable, said control means being logically connected to at least one of said submerged branching unit and said on-shore SLTE.

12. The landing-stage according to claim 11, wherein said control means include on/off blocking amplifiers in said at least two at least partially submerged optical cables.

13. The landing-stage according to claim 12, wherein the changeover means in the on-shore SLTE includes at least one optical splitter.

14. The landing-stage according to claim 13, wherein each one of said two at least partially submerged optical cables has at least one pair of optical fibres.

15. A submarine optical communications system comprising:
   a submarine optical cables;
   a landing-stage coupled to said submarine optical cable, the landing stage comprising:
      a submerged branching units;
      an onshore submarine line terminal endstation ("SLTE");
      at least two at least partially submerged optical cables between said branching unit and said SLTE, said submarine cable connected to the branching unit, the branching unit operative to couple the at least two at least partially submerged optical cables to said submarine optical cable, said at least two at least partially submerged optical cables being spaced apart from each other.

16. The submarine communications system according to claim 15, wherein each landing-stage of the system is a said landing-stage.

17. A submarine optical communications system comprising:
   submarine optical cables;
   a landing-stage, said landing-stage comprising:
      a submerged branching unit operatively coupling said submarine optical cable to at least two at least partially submerged optical cables via respective changeover means which are optical splitter means, said at least two at least partially submerged optical cables operatively coupled to an on-shore SLTE via respective changeover means; and
   control means for determining which of said at least two at least partially submerged optical cables conducts traffic to or from said submarine optical cable, said control means being logically connected to at least one of said submerged branching unit and said on-shore SLTE.

18. A submerged branching unit adapted for a landing-stage in a submarine optical communications system, the submerged branching unit comprising a coupler unit including at least one of an optical switch and an optical splitter configured operatively to couple a submarine optical cable to at least two at least partially submerged optical cables, the at least two at least partially submerged optical cables operatively coupled to an on-shore SLTE via a changeover unit.

19. The submerged branching unit of claim 18, wherein said control unit includes on/off blocking amplifiers in the at least two at least partially submerged optical cables.

20. The submerged branching unit of claim 18, wherein each one of the at least two at least partially submerged optical cables has at least one pair of optical fibers.

* * * * *